(12) United States Patent
Bernstein et al.

(10) Patent No.: US 11,188,534 B2
(45) Date of Patent: Nov. 30, 2021

(54) OPTIMIZING INPUT STREAMS FOR A STREAM JOIN MODEL HAVING A THRESHOLD FUNCTION

(71) Applicant: Microsoft Technology Licensing, LLC, Redmond, WA (US)

(72) Inventors: Philip Alan Bernstein, Bellevue, WA (US); Walter Zhen Cai, Seattle, WA (US); Wentao Wu, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/742,907

(22) Filed: Jan. 14, 2020

(65) Prior Publication Data

US 2021/0216549 A1 Jul. 15, 2021

(51) Int. Cl.
*G06F 16/24* (2019.01)
*G06F 16/2453* (2019.01)
*G06F 16/2455* (2019.01)
*G16Y 10/75* (2020.01)

(52) U.S. Cl.
CPC .. *G06F 16/24544* (2019.01); *G06F 16/24537* (2019.01); *G06F 16/24568* (2019.01); *G16Y 10/75* (2020.01)

(58) Field of Classification Search
None
See application file for complete search history.

(56) References Cited

U.S. PATENT DOCUMENTS

| | | | |
|---|---|---|---|
| 2005/0223026 A1* | 10/2005 | Chaudhuri | G06F 16/217 |
| 2007/0288635 A1* | 12/2007 | Gu | G06F 16/24568 |
| 2009/0271529 A1* | 10/2009 | Kashiyama | G06F 16/2455 710/1 |
| 2009/0287628 A1 | 11/2009 | Indeck et al. | |
| 2010/0262862 A1* | 10/2010 | Watanabe | G06F 16/24 707/E17.017 |

(Continued)

OTHER PUBLICATIONS

"International Search Report and Written Opinion Issued in PCT Application No. PCT/US20/064399", dated Mar. 29, 2021, 14 Pages.

(Continued)

*Primary Examiner* — Son T Hoang
(74) *Attorney, Agent, or Firm* — Ray Quinney & Nebeker P.C; James Bullough

(57) ABSTRACT

This application describes a data stream processing system for receiving and processing multiple data streams using a stream join model and based on the stream join model having a threshold function for which an output of the stream join model crosses the threshold two or less times (e.g., where the threshold function is a convex function, linear function, monotonic function, or other function having a similar property). The data stream processing system may generate filtered data streams using a number of techniques and algorithms without risk of false negatives and mis2169sing instances where an output of a stream join exceeds or violates a threshold condition. The data stream processing system can significantly reduce processing expense, particularly in cases where one or more devices have limited memory and where caching tuples from incoming data streams consumes significant processing resources.

20 Claims, 10 Drawing Sheets

(56) References Cited

U.S. PATENT DOCUMENTS

2014/0237134 A1* 8/2014 Branson .............. G06F 16/2453
2016/0217148 A1   7/2016 Branson et al.
2016/0283554 A1* 9/2016 Ray .................... G06F 16/2456
2016/0306857 A1* 10/2016 Barsness ............... G06F 16/254
2016/0366042 A1* 12/2016 Branson ............ G06F 16/24568
2020/0158526 A1* 5/2020 Mckenna ................ G06F 16/27

OTHER PUBLICATIONS

Xie, et al., "A Survey of Join Processing in Data Streams", In Book Springer Data Streams, vol. 31, Jan. 1, 2007, 27 Pages.

* cited by examiner

OPTIMIZING INPUT STREAMS FOR A STREAM JOIN MODEL HAVING A THRESHOLD FUNCTION

BACKGROUND

Recent years have seen a precipitous rise in the use of computing devices (e.g., mobile devices, personal computers, Internet of Things (IoT) devices, server devices) to create, store, monitor, and otherwise process various types of data. Indeed, tools and applications for processing data from a variety of sources and systems is becoming more and more common. Many of these tools and applications may receive large quantities of data from multiple sources. For example, many computing systems and/or cloud computing systems provide tools and services for receiving multiple streams of data from different sources and performing operations on elements of the multiple streams (e.g., join functions).

While stream processing provides a useful and effective tool for analyzing large quantities of incoming data from multiple sources, stream processing has a number of problems and drawbacks. For example, many conventional systems have limited processing capabilities that become overloaded when large quantities of data are received from multiple sources. As a result, conventional systems often experience lag or even run out of memory when attempting to perform operations on multiple data streams. Moreover, where one or more data streams selectively experience a delay or lag in transmitting or receiving data, conventional systems may attempt to cache data from one or more additional data streams resulting in the processing capacity of the conventional computing systems becoming overloaded.

These and other problems exist with regard to receiving and processing multiple streams of data originating from multiple sources.

DETAILED DESCRIPTION

Figure 1:
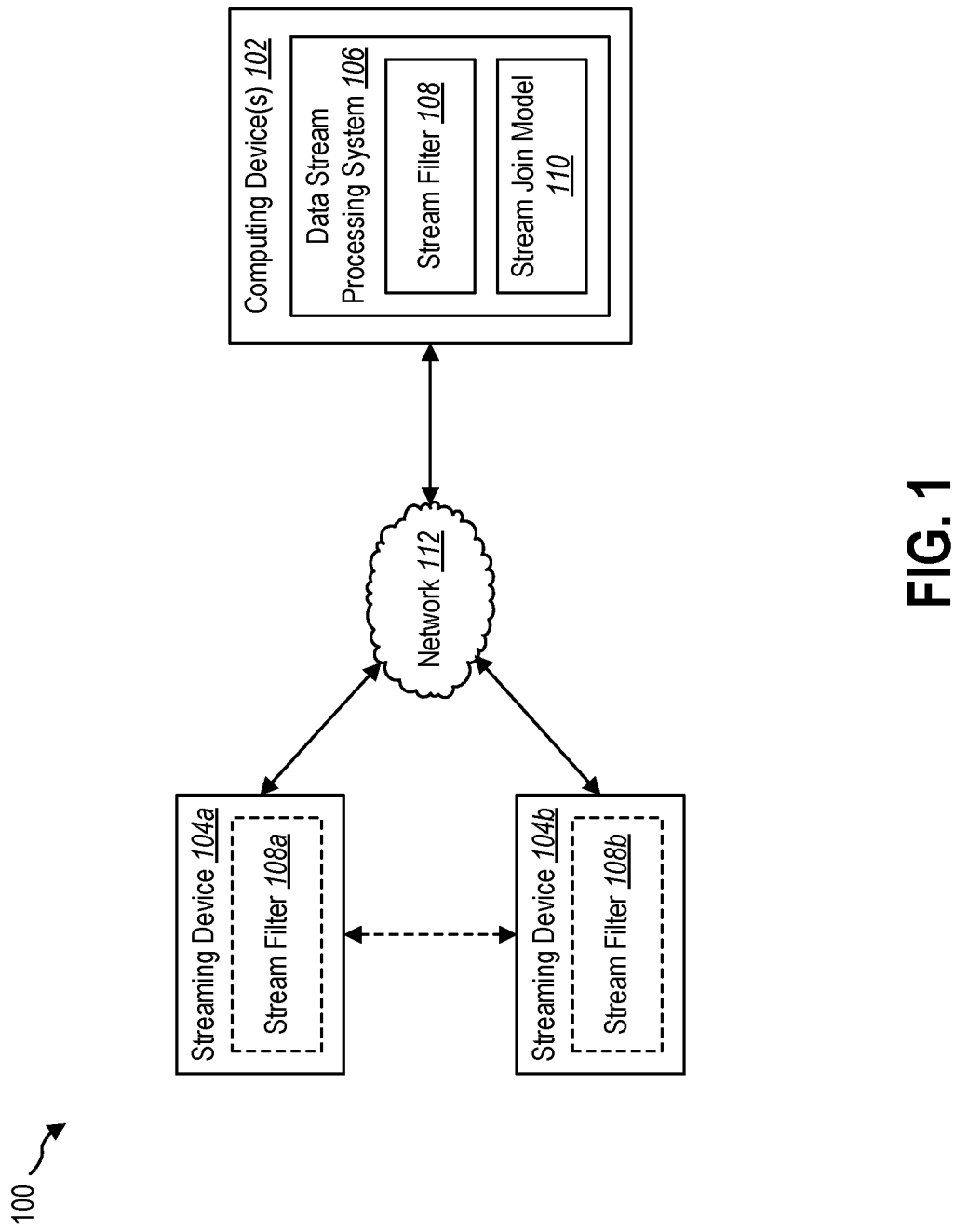
FIG. 1 illustrates an example environment including a data stream processing system in accordance with one or more embodiments.

The present disclosure relates to a data stream processing system for receiving and processing multiple data streams from multiple sources. In particular, as will be discussed in further detail below, a first device (e.g., a first streaming device) can generate a first data stream including any number of values while a second device generates a second data stream including any number of associated values (e.g., values generated within a similar interval of time as corresponding values from the first stream). One or both of the data streams can be filtered prior to applying a stream join model to the first and second data streams. In particular, and as will be discussed in further detail below, based on a determination that the stream join model includes a threshold function having one or more properties in which an output of the stream join model (e.g., a payload value of the stream join model output) crosses a threshold value two or less times (and for which a set of values that triggers the threshold do not live between the two crossing points), the data stream processing system can apply one or more filters to the data stream(s).

For example, upon identifying that a stream join model includes one or more of a step function, linear function, convex function, monotonic function, or other threshold function for which an output of the function(s) crosses a threshold value two or less times (and where a set of output values that triggers the threshold do not live between the two crossing points), the data stream processing system can generate a filtered data stream for one or more incoming data streams. In particular, in one or more implementations, a data stream processing system can receive a first data stream from a first device and a second data stream from a second device where each of the data streams includes tuples to be provided as inputs to the stream join model.

As will be discussed in further detail below, the data stream processing system can identify windows of tuples and determine which tuple(s) of a set of tuples within the identified window(s) may be omitted as inputs to the stream join model. For example, the data stream processing system can determine whether one or more tuples of a data stream are dominated by other tuples from a set of tuples within a given window. In one or more embodiments, the data stream processing system eliminates one or more values determined to be bracketed by time and value within the given window. Additional detail in connection with generating a filtered data stream will be provided by way of various workflows and examples below.

The data stream processing system can be implemented on a number of different devices and environments. For example, in one or more embodiments described herein, the data stream processing system is implemented on a computing device that receives and generates filtered data streams. For instance, in one or more embodiments, the computing device receives data streams as tuples (e.g., a value and associated timestamp) are generated and generates one or more filtered data streams upon receiving the tuples. The data stream processing system can then apply the stream join model to the filtered data streams in accordance with one or more embodiments herein.

In one or more implementations, features and functionalities of the data stream processing system may be implemented on one or more of the respective streaming devices. For example, a streaming device can locally evaluate and discard one or more tuples from a data stream and provide a filtered data stream to a computing device to be provided as input to the stream join model. Upon receiving the filtered data stream(s) the data stream processing system can apply the stream join model to the filtered data stream(s) in accordance with one or more embodiments described herein.

As will be discussed in further detail below, filtering the data stream(s) may be performed at the respective devices because conditions for omission may be local to a particular data stream. Thus, while a central computing device that receives data from the streaming devices may perform a filtering process; one or more of the respective streaming devices may additionally or alternatively perform a filtering process, as mentioned above, and as will be discussed in further detail below.

As mentioned above, where the stream join model includes one or more of a step function, a linear function, a convex function, monotonic function, or any threshold function having a specific property in which an output of the function(s) crosses a threshold two or less times, the data stream processing system can omit certain values without missing any critical values. In particular, because an output of the stream join model (e.g., a payload value of the stream join model output) only crosses a critical threshold two or less times (and where a set of values that triggers a threshold do not live between the two crossing points), the data stream processing system may rely on standard results in functional analysis to determine that maximum and minimum values of tuples within a given window may be used to rule out certain tuples that are dominated or fall between maximum and minimum values within the window.

The present disclosure includes a number of practical applications that provide benefits and/or solve problems associated with receiving and processing data streams having any number of tuples. For example, by generating filtered data streams that include fewer than all of the captured or generated values for a given data stream, the data stream processing system can significantly reduce the expense of processing resources on a computing device (e.g., personal computing device, server device(s), cloud computing system) when analyzing values from the data streams. In particular, where the data stream processing system is applying a stream join model to two or more data streams, generating and providing filtered data streams as inputs to the stream join model can improve memory capacity on one or more computing devices.

In addition to generally reducing the expense of processing resources, the data stream processing system can additionally enable a computing device to cache values of a data stream for a longer duration of time, particularly where one or more data streams are experiencing difficulties in providing data to the computing device. For example, where a first streaming device loses connectivity with a computing device having the data stream processing system implemented thereon, the data stream processing system may cache inputs from a filtered data stream from a second streaming device without straining processing resources of the computing device while waiting for the first streaming device to re-establish a connection with the computing device. Indeed, the data stream processing system can cache filtered data streams for significantly longer than conventional systems independent of whether the data streams are filtered on the computing device or on the respective streaming devices.

As illustrated in the foregoing discussion, the present disclosure utilizes a variety of terms to describe features and advantages of the data stream processing system. Additional detail will now be provided regarding the meaning of some of these terms. For example, as used herein, a "streaming device" refers to any device capable of generating a data stream including data values and corresponding time values. For example, a streaming device may refer to an electronic device having one or more sensors thereon capable of capturing data and outputting signals based on the captured data. Examples of streaming devices may include temperature sensors, humidity sensors, acceleration sensors, direction sensors, optical sensors, sound sensors (e.g., a microphone), pressure sensors, proximity sensors, seismic sensors, etc. A streaming device may also refer to a software component that generates output signals, such as performance measurements, error events, security violations, etc. The software component may derive the output signals, e.g., using machine learning, from another data stream, such as a video stream, audio stream, keyboard clickstream, etc. In one or more embodiments described herein streaming devices may be implemented within a common electronic device (e.g., two different sensors of the same computing system). Alternatively, streaming devices may be implemented on different devices. In one or more embodiments described herein a streaming device refers to an IoT device in communication with one or more additional devices.

As used herein, a "data stream" refers to any data generated by a streaming device. In particular, a data stream may refer to a stream of continuous data generated by and provided to a computing device from the streaming device. The data stream may include any number of tuples. As used herein, a "tuple" refers to a pair of values including a data value and a time value. The data value may refer to any value captured or generated by a streaming device where a corresponding time value refers to a time that the value was captured or generated by the streaming device. Thus, as used in connection with one or more examples discussed herein, a tuple may refer to a data value (or simply "value") and a corresponding timestamp.

As used herein, a "window," or "tuple window" refers interchangeably to an interval of time having a predetermined duration. A window may include any number of tuples from a data stream based on timestamps of the tuples. In one or more embodiments described herein, a window specifically refers to an interval of time with reference to a specific tuple whose timestamp identifies a midpoint or other reference point of the predetermined interval or duration of the window. A window may be determined by a user (e.g., a selected time interval) or based on characteristics of a function, streaming device, and/or stream join model.

Moreover, while one or more embodiments described herein specifically refer to a window as an interval that defines a set of tuples (e.g., a tuple window) that may be considered in determining whether to discard one or more dominated tuples when generating a filtered data stream, the same window or different window (e.g., a join window) may be applicable in determining whether tuples of two different data streams may be joined together when applying a stream join model to a set of inputs. Thus, while one or more embodiments described herein refer to a tuple window and a join window as having the same interval and/or same timeframe, it will be understood that tuple windows and join windows may be independent from one another (e.g., have different applicable intervals) in one or more embodiments described herein.

As used herein, a "stream join model" refers to one or more algorithms or operations that may be applied to two or more data streams. In particular, in one or more embodiments described herein, a stream join model includes any threshold function for which an output of the threshold function crosses a threshold two or less times with respect to a variable (and for which a set of values that trigger the threshold are not between the two crossing points). Examples of functions of the stream join model may include step functions, linear functions, convex functions, monotonic functions, or other threshold function. Moreover, while one or more examples described herein refer specifically to a stream join model and associated functions having a convex property (e.g., where a function refers to a linear or otherwise convex function), features and functionalities described in connection with individual examples may similarly refer to any threshold function for which an output of the threshold function crosses a threshold two or less times with respect to a variable and for which a set of values that triggers the threshold do not live between the two crossing points.

As used herein, an output of the stream join model may refer to a variety of outputs of the stream join model. For example, the output may refer to a stream of tuples based on the incoming data streams. Alternatively, an output of the stream join model may refer to payload value(s) of the output. As mentioned above and in accordance with one or more examples herein, the payload values of the stream join model may cross a threshold two or less times with respect to a variable. For instance, the output may cross the threshold continuously (e.g., as part of an output of a continuous function) or discontinuously (e.g., as part of a step function).

Additional detail will now be provided regarding a data stream processing system in relation to illustrative figures portraying example implementations. For example, FIG. 1 illustrates an example environment 100 including a computing device(s) 102 and streaming devices 104a-b capable of generating respective data streams (e.g., first and second data streams). One or more embodiments may include additional streaming devices capable of generating additional data streams.

As shown in FIG. 1, the computing device(s) 102 may include a data stream processing system 106 having a stream filter 108 and a stream join model 110. As further shown, the environment 100 includes a first streaming device 104a and a second streaming device 104b. The first streaming device 104a may optionally include a first stream filter 108a implemented thereon. The second streaming device 104b may additionally (or alternatively) include a second stream filter 108b thereon. The stream filter 108 on the computing device(s) 102 may have similar features and functionality as one or both of the stream filters 108a-b on the respective streaming devices 104a-b.

The computing device(s) 102 and streaming devices 104a-b can communicate with each other directly or indirectly through a network 112. The network 112 may include one or multiple networks and may use one or more communication platforms or technologies suitable for transmitting data. The network 112 may refer to any data link that enables the transport of electronic data between devices and/or modules of the environment 100. The network 112 may refer to a hardwired network, a wireless network, or a combination of hardwired and wireless networks. In one or more embodiments the network 112 includes the Internet. As further shown, while the streaming devices 104a-b may communicate with the computing device(s) 102 over the network 112, in one or more implementations, the streaming devices 104a-b may communicate via a direct communication link or, alternatively, via the network 112 as mentioned above.

The streaming devices 104a-b may refer to a variety of devices capable of generating data streams. For example, the streaming devices 104a-b may refer to data stream generation devices such as temperature sensors, humidity sensors, acceleration sensors, direction sensors, optical sensors, sound sensors (e.g., a microphone), pressure sensors, proximity sensors, seismic sensors, or other kind of devices. In addition, the streaming devices 104a-b may refer to similar types of devices and/or different types of devices. The streaming devices 104a-b may be implemented on different systems. Alternatively, the streaming devices 104a-b may refer to different sensors or components of a single device or interconnected system.

The computing device(s) 102 may refer to various types of computing devices. For example, a computing device 102 may refer to a mobile device such as a mobile telephone, a smartphone, a PDA, a tablet, or a laptop. Additionally, or alternatively, the computing device(s) 102 may refer to a non-mobile device such as a desktop computer, server device, or other non-portable device. In one or more embodiments, the computing device(s) 102 refers to computing nodes on a cloud computing system capable of hosting services that provide one or more of the features and functionalities of the data stream processing system 106 described herein. Each of the computing device(s) 102 and the streaming device(s) 104a-b may include features and functionality generally discussed below in connection with FIG. 7.

As mentioned above, each of the streaming devices 104a-b may generate respective data streams including ordered tuples. For example, the first streaming device 104a may generate a first data stream including tuples representative of data values captured at corresponding timestamps. Similarly, the second streaming device 104b may generate a second data stream including tuples representative of data values captured at corresponding timestamps. The streaming devices 104a-b may generate data streams having tuples that correspond to the same or slightly different timestamps. In addition, the streaming devices 104a-b may generate data streams at different frequencies or sample rates, resulting in one of the data streams having a higher number of datapoints than the other data stream.

In one or more embodiments, the streaming devices 104a-b provide respective data streams to the computing device(s) 102. As shown in FIG. 1, the data stream processing system 106 can apply a stream filter 108 to the incoming data streams to generate one or more filtered data streams. For example, the data stream processing system 106 can apply the stream filter 108 to a first data stream to omit one or more values from the data stream that are dominated by one or more additional values of the data stream. The stream filter 108 may additionally or alternatively apply the stream filter 108 to the second data stream to omit one or more values from the data stream that are dominated by one or more additional values.

As will be discussed in further detail below, the stream filter 108 can generate filtered data streams in a number of ways. In particular, based on a determination that the stream join model 110 has a convex property (or other property that signals that an output with respect to a variable will only cross a threshold 2 or less times), the stream filter 108 may be used to determine that certain tuples from the data stream may be omitted from consideration by the stream join model 110 without risking false negatives from omitting dominated values from a join function. These filtered data streams may be stored in memory of the computing device(s) 102 and provided as input to the stream join model 110.

As used herein, a "join function" or "join operator" refers to any operator or model that may be used or is otherwise configured to join elements together. For instance, a join function may refer to an operator that joins elements of one or multiple data streams together in accordance with one or more examples described herein. In one or more embodiments described herein, a join function may include a multi-variable threshold function that receives two or more inputs (e.g., input data streams, filtered data streams) and generates one or multiple outputs based on the two or more inputs. In one or more examples described herein, a join function specifically includes a threshold function that detects whether a threshold condition exists with respect to multiple data streams.

While FIG. 1 illustrates an example in which the data streams are provided to the computing device(s) 102 to be filtered by the stream filter 108 on the computing device(s) 102, in one or more embodiments, one or both of the streaming device(s) 104a-b may have stream filters 108a-b implemented thereon. The stream filters 108a-b on the respective streaming devices 104a-b may have similar features and functionality as the stream filter 108 described above implemented on the computing device(s) 102. In one or more embodiments, the stream filters 108a-b are located exclusively on the streaming devices 104a-b and filtered data streams are provided to the computing device(s) 102 to provide as inputs to the stream join model 110.

In one or more embodiments, the stream filters 108, 108a-b are located and implemented on the respective devices based on computing capabilities of the different devices. For instance, where one or both of the streaming devices 104a-b are IoT devices having limited processing capability, the computing device 102 may exclusively perform filtering of the data streams originating from the respective streaming devices 104a-b. Alternatively, where one or both of the streaming devices 104a-b have sufficient processing capabilities, one or both of the streaming devices 104a-b may implement the stream filters 108a-b.

As further shown in FIG. 1, the data stream processing system 106 includes a stream join model 110. As mentioned above, the stream join model 110 may include one or more threshold functions having an output that with respect to a variable only crosses a threshold two or less times. As an example, the stream join model 110 may include a linear function, a convex function, a step function, or other type of function having similar properties.

While the stream join model 110 may include a variety of functions that receive any combination of data streams having tuples that include different types of values, one or more embodiments described herein will be discussed in connection with an example in which a first data stream refers to a stream of temperature values and a second data stream refers to a stream of humidity values. In this example, the stream join model 110 may refer to a dew point calculation function based on a join of temperature and humidity values that occur within a given time interval. For instance, in this non-limiting example, the stream join model 110 may include the following formula:

$$C = 10 \cdot m_h + m_t^2$$

Where $m_h$ refers to a humidity measurement (e.g., from a first streaming device 104a), $m_t$ refers to a temperature measurement (e.g., from a second streaming device 104b), and where if C exceeds 0.8 (or some other predetermined threshold or critical value), an alarm is raised. In addition, one or more examples described herein relate to an interval-based stream join model 110 in which tuples from respective data streams may be joined if the timestamps for the tuples are within a predetermined interval of one another. In accordance with one or more embodiments described herein, this function may have a convex property in which the function between two endpoints would not cross a threshold value more than twice.

It will be appreciated, however, that while one or more examples are described in connection with a specific example or specific formula(s), features and functionalities of the data stream processing system 106 may similarly apply to other use cases in which the data streams include other types of data values and the stream join model 110 includes different specific formulas or operations.

Moreover, while FIG. 1 illustrates an example environment 100 including a particular number and arrangement of the computing device(s) 102 and streaming devices 104a-b, it will be understood that the environment 100 may include any number of devices capable of implementing different features and functionalities of the data stream processing system 106. For example, the environment 100 may include three or more streaming devices 104a-b configured to generate similar or different types of data values. In addition, and as mentioned above, the stream filter 108 may be implemented in whole or in part on the computing device(s) 102 and/or on one or more of the streaming devices 104a-b.

Figure 2A:
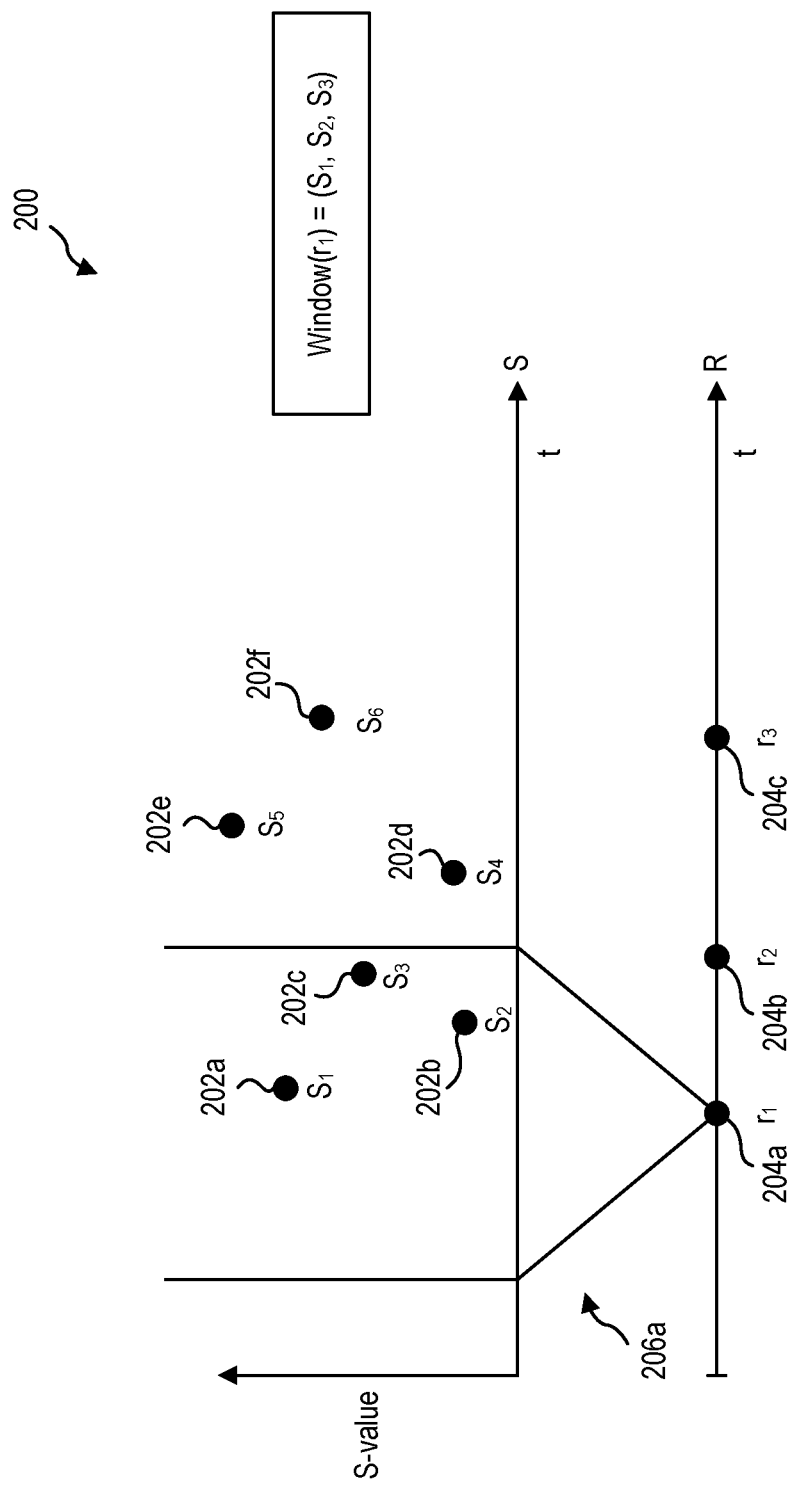
FIGS. 2A-2C illustrate an example execution of an implementation that filters a data stream in accordance with one or more embodiments.
Figure 2B:
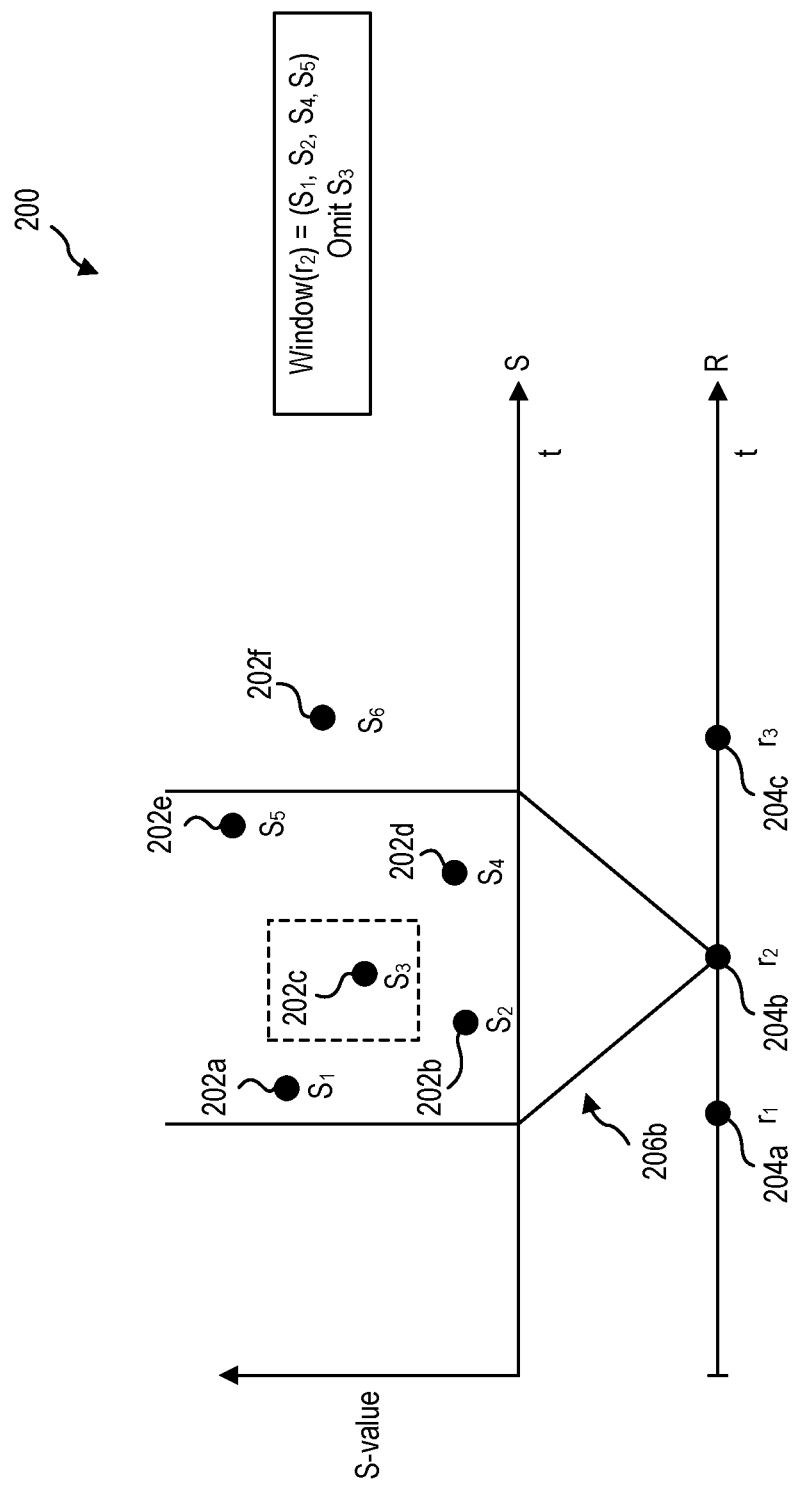
Figure 2C:
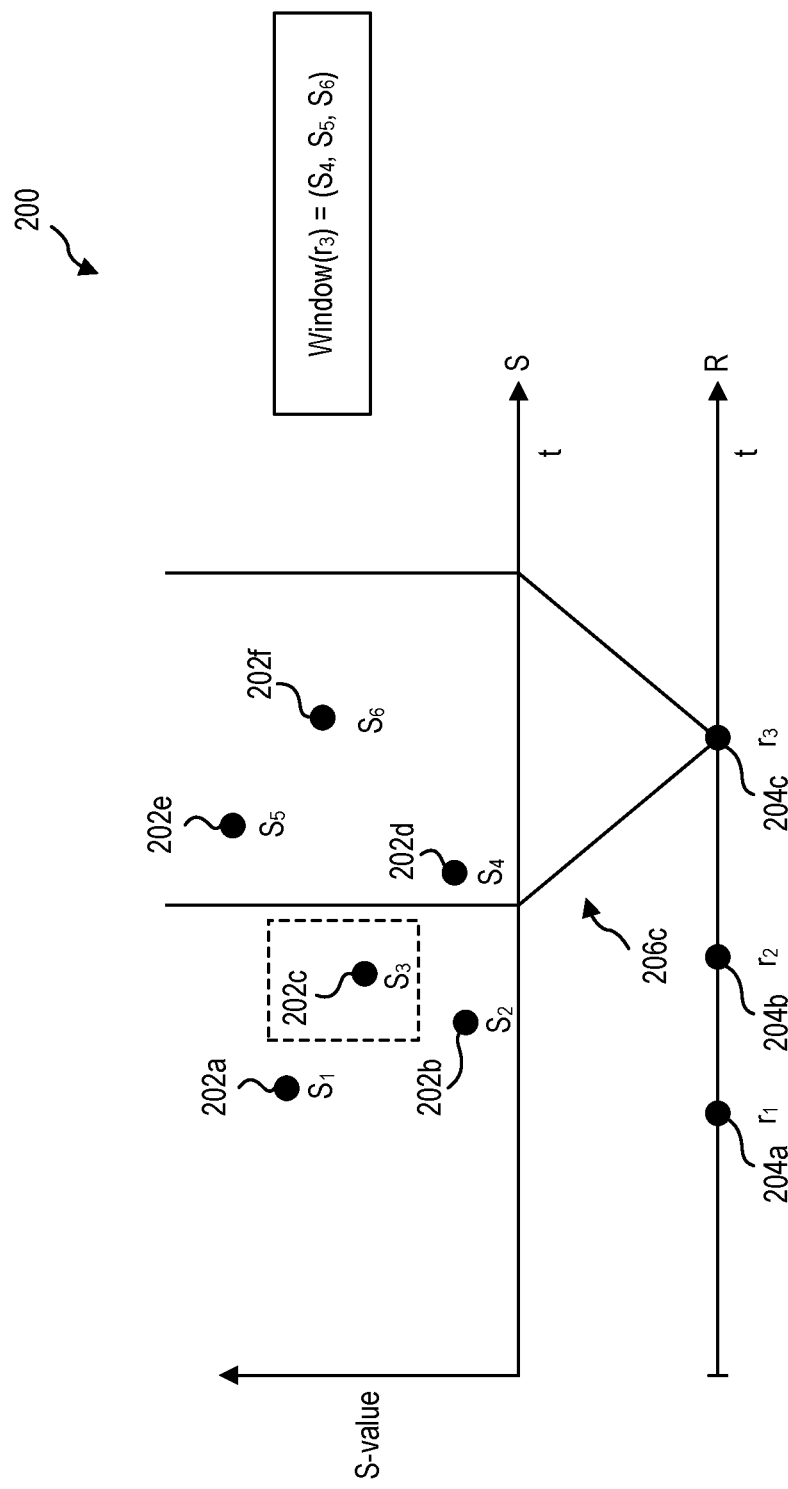

Additional detail will now be given in connection with an example implementation of the data stream processing system 106 for generating a filtered data stream in accordance with one or more embodiments. For example, FIGS. 2A-2C illustrate a technique for generating a filtered data stream for a first data stream by evaluating sets of tuples from the first data stream contained within windows corresponding to individual tuples of a second data stream. In particular, FIGS. 2A-2C relates to an example in which a first streaming device generates a first data stream (e.g., an S-stream) and a second streaming device generates a second data stream (e.g., an R-stream).

FIG. 2A illustrates a graph 200 of tuple values corresponding to an S-stream and an R-stream. In this visualization, a first plurality of tuples 202a-f are plotted at corresponding S-values and time (t) values based on pairs of values within each of the plurality of tuples 202a-f. As further shown, a second plurality of tuples 204a-c are plotted along at corresponding t-values on a single axis. For ease in explanation, the R-values of the second plurality of tuples 204a-c are not shown.

As shown in FIG. 2A, the data stream processing system 106 can identify a first window 206a corresponding to a first tuple 204a (e.g., a timestamp of the first tuple 204a) from the second plurality of tuples 204a-c. The first window 206a may have a predetermined interval and may enclose any number of tuples from the first plurality of tuples 202a-f. In the example shown, the first window 206a encloses a subset of tuples from the first plurality of tuples 202a-f. In particular, the subset of tuples includes a first tuple 202a, a second tuple 202b, and a third tuple 202c.

Upon identifying the set of tuples within the first window 206a, the data stream processing system 106 can evaluate the set of tuples and determine whether one or more of the tuples should be omitted from the filtered data stream. In one or more embodiments, the data stream processing system 106 determines whether one or more tuples from the set of tuples enclosed within the first window 206a should be omitted by determining whether one or more tuples from the set of tuples are dominated (e.g., bracketed) by other tuples within the set of tuples. For example, the data stream processing system 106 may determine whether a tuple from the set of tuples is both time and value bound by other tuples within the set of tuples contained within the first window 206a.

In one or more embodiments, the data stream processing system 106 evaluates one or more tuples from the set of tuples to determine whether the tuple(s) are both time and value bound by a set of four tuples within the same window. In particular, in one or more embodiments, the data stream processing system 106 determines whether a given tuple is surrounded by a first tuple having an earlier time stamp and a lower value, a second tuple having an earlier time stamp and a higher value, a third tuple having a later time stamp and a lower value, and a fourth tuple having a later time stamp and a higher value. In this example, the data stream processing system 106 may determine that none of the tuples from the set of tuples within the first window 206a are dominated by other tuples within the set of tuples. As a result, the data stream processing system 106 may determine to not discard or otherwise omit any of the first set of tuples from the S-stream in connection with evaluating the first window 206a.

The data stream processing system 106 may continue to evaluate additional sets of tuples enclosed within additional windows. For example, as shown in FIG. 2B, the data stream processing system 106 may identify a second window 206b corresponding to a second tuple 206b (e.g., a timestamp of the second tuple 204b) from the second plurality of tuples 204a-c. The second window 206b may have a predetermined interval (e.g., the same interval as the first window 204a) and may enclose any number of tuples from the first plurality of tuples 202a-f that fall within the interval of the second window 206b. In particular, as shown in FIG. 2B, the second window 206b may enclose a subset of tuples including a first tuple 202a, a second tuple 202b, a third tuple 202c, a fourth tuple 202d, and a fifth tuple 202e.

Similar to the process described above in connection with the first window 206a, the data stream processing system 106 can similarly evaluate the set of tuples enclosed within the second window 206b to determine whether one or more of the set of tuples should be omitted when generating the filtered data stream. For example, the data stream processing system 106 can determine whether one or more tuples are dominated by other tuples within the set of tuples. In particular, in one or more embodiments, the data stream processing system 106 may identify or otherwise determine any tuples bracketed by time and value by other tuples within the set of tuples.

In the example shown in FIG. 2B, the data stream processing system 106 may determine that the third tuple 202c is bracketed or otherwise dominated by other tuples within the set of tuples enclosed within the second window 206b. In particular, using one or more algorithms such as example(s) discussed in further detail below, the data stream processing system 106 can determine that the third tuple 202c is bracketed by four other tuples within the second window 206b. In particular, the data stream processing system 106 may identify that the third tuple is bracketed by the first tuple 202a having an earlier time stamp and higher value, the second tuple 202b having an earlier time stamp and lower value, the fourth tuple 202d having a later time stamp and lower value, and the fifth tuple 202e having a later time stamp and a higher value. Based on this determination, the data stream processing system 106 may determine to discard the third tuple 202c from a filtered data stream generated from the S-stream.

The data stream processing system 106 may continue to iteratively evaluate windows enclosing sets of tuples from the S-stream based on time stamps of additional tuples from the R-stream. For example, as illustrated in FIG. 2C, the data stream processing system 106 may identify a third window 206c corresponding to a third tuple 204c from the second plurality of tuples 204a-c. The third window 206c may have the same predetermined interval as the first and second windows 206a-b and may enclose any number of tuples from the first plurality of tuples 202a-f that fall within the interval of the third window 206c. In particular, as shown in FIG. 2C, the third window may enclose a subset of tuples including a fourth tuple 202d, a fifth tuple 202e, and a sixth tuple 202f.

Similar to the process described above in connection with the first and second windows 206a-b, the data stream processing system 106 can similarly evaluate the set of tuples enclosed within the third window 206c to determine whether one or more of the set of tuples should be omitted when generating the filtered data stream. For example, the data stream processing system 106 can determine whether any of the tuples within the third window 206c are dominated or bracketed by time and value by other tuples (e.g., four other tuples) within the set of tuples. In this example, similar to the first window 206a, the data stream processing system 106 may determine that none of the tuples within the third window 206c are fully dominated by any other tuples and determine that none of the tuples enclosed within the third window 206c should be discarded when generating the filtered data stream.

It will be appreciated that the above example described in connection with FIGS. 2A-2C is provided by way of illustration and not limitation. Indeed, it will be appreciated that the two streams may include any number of tuples based on sample rates of corresponding streaming devices. Moreover, while FIGS. 2A-2C illustrate an example where the S-stream is filtered, the same process may be applied to generate a filtered data stream for the R-stream. For example, while not shown in FIGS. 2A-2C, the R-values may be plotted against a second axis (e.g., an R-value axis) while the S-values may be plotted along a single axis (e.g., the t-axis) and any number of windows may be identified in a similar fashion to determine whether one or more of the tuples from the R-stream should be omitted from a filtered data stream.

Moreover, while FIGS. 2A-2C illustrate an example in which each tuple from a first stream (e.g., the R-stream) may be used as a reference for each iterative window, other embodiments may determine windows using other techniques. For example, the data stream processing system 106 may generate tuple windows at regular intervals or based on knowledge about the sample rate or expected timestamps of the R-stream. In this way, even where the R-stream may be lagging or where a computing device receives tuples from different sources at different times, the data stream processing system 106 may nonetheless continue implementing a stream filter to generate filtered data stream(s) in accordance with one or more embodiments described herein.

Figure 3:
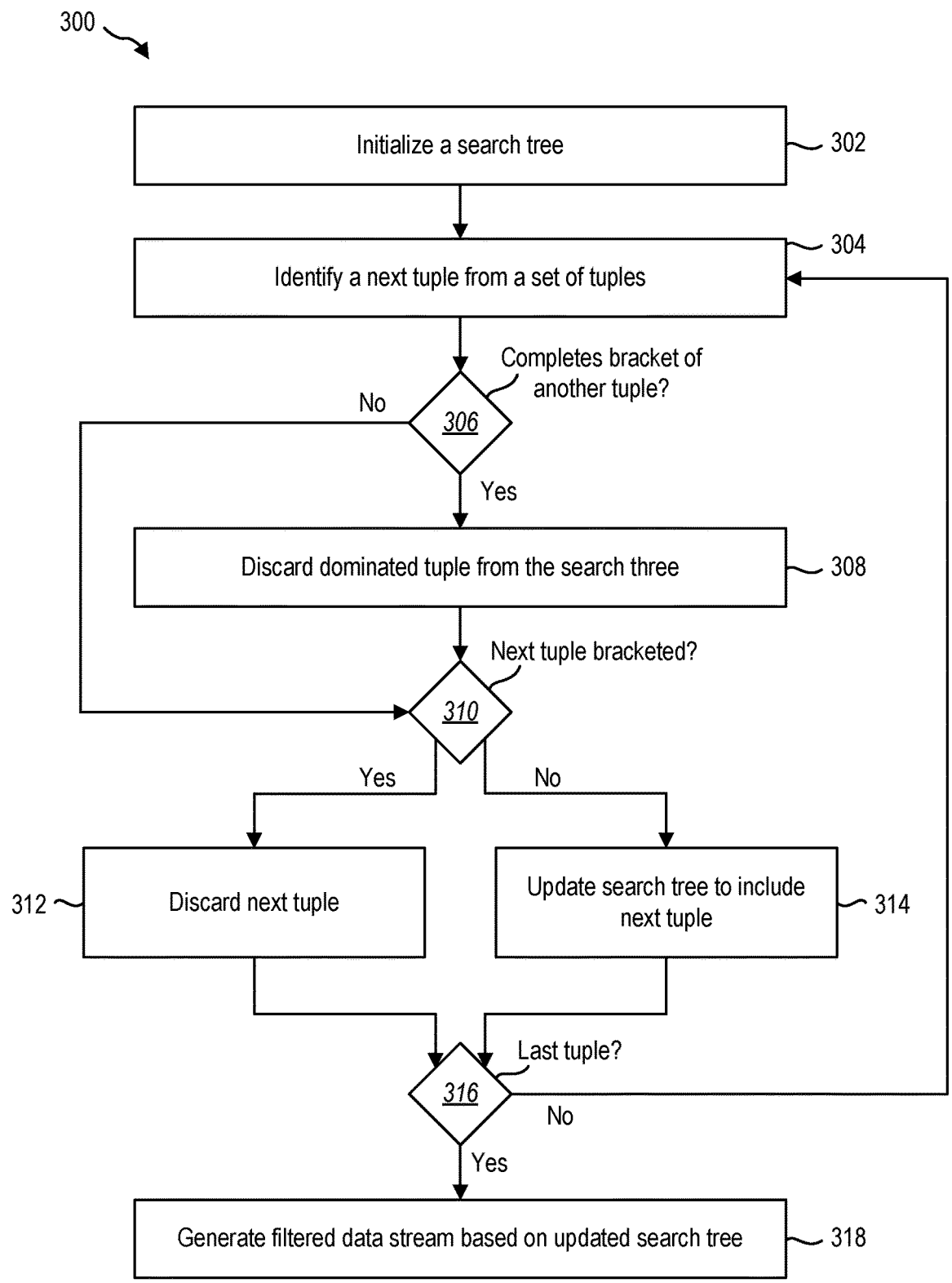
FIG. 3 illustrates an example workflow for iteratively evaluating and determining whether to omit one or more tuples from a set of tuples in accordance with one or more embodiments.

While FIGS. 2A-2C illustrate an example in which the data stream processing system 106 iteratively evaluates multiple windows that enclose tuples of a given data stream, FIG. 3 illustrates an example implementation of a workflow 300 in which the data stream processing system 106 may iteratively evaluate tuples of a given window to determine any number of tuples that may be discarded from a data stream. More specifically, FIG. 3 illustrates an example series of acts in which a data stream processing system 106 may iteratively scan through tuples of an identified window to determine which of the tuples are dominated (e.g., bracketed) and, based on that determination, which of the tuples may be discarded without risking occurrence of false negatives as a result of omitting tuples from the data stream(s). This workflow 300 is provided by way of example and meant to illustrate one technique in which a window of tuples may be evaluated to determine one or more tuples to discard when generating a filtered data stream.

For example, as shown in FIG. 3, upon identifying a window of tuples (e.g., of a predetermined interval), the data stream processing system 106 may perform an act 302 of initializing a search tree from which the data stream processing system 106 can generate and/or update a filtered data stream. In one or more embodiments, the search tree refers to a red-black tree, which may be updated to include any number of tuples therein. When initialized, the search tree may include zero tuples. In addition, the data stream processing system 106 may initialize bracket values within an interval (w) from a reference time stamp used when identifying the window of interest (e.g., a timestamp of another data stream that corresponds to the window).

As further shown in FIG. 3, the data stream processing system 106 may perform an act 304 of identifying a next tuple from a set of tuples. In particular, the data stream processing system 106 can identify a first tuple or iterate to a next tuple yet to be evaluated from a set of tuples enclosed within the window. The data stream processing system 106 can identify the tuples in any particular order. For example, the data stream processing system 106 can iteratively scan through and identify a next tuple corresponding to a tuple from the set of tuples having the next iterative time stamp. Alternatively, the data stream processing system 106 can implement a greedy algorithm (discussed below) and identify next or previous values of a set of tuples that may affect stored bracket values within the search tree. In one or more embodiments, the data stream processing system 106 randomly identifies a next tuple from the set of tuples.

The data stream processing system 106 can then scan or probe the window in a variety of ways. In one or more embodiments, the data stream processing system 106 performs an act 306 of determining whether the next tuple completes a bracket of another tuple. In particular, prior to or in conjunction with determining whether a tuple is bracketed or otherwise dominated by other tuples within the set of tuples, the data stream processing system 106 can determine whether the tuple of interest completes a bracket of another tuple previously evaluated within the window and which is already included within the search tree. As will be discussed in further detail below, the data stream processing system 106 can update the search tree to include or omit one or more tuples as each tuple is evaluated.

As shown in FIG. 3, if the tuple completes a bracket of another tuple (e.g., a tuple previously added to the search tree), the data stream processing system 106 can perform an act 308 of discarding or otherwise omitting the other tuple for which the bracket is complete from the search tree. In accordance with one or more embodiments described above, the other tuple may then be discarded from the filtered data stream to be provided as an input to the stream join model 110.

Alternatively, if the tuple does not complete a bracket of another tuple, the data stream processing system 106 can continue evaluating the next tuple. For example, as shown in FIG. 3, the data stream processing system 106 can perform an act 310 of determining whether the next tuple is bracketed by other tuples within the set of windows. In particular, as discussed above, the data stream processing system 106 can determine if the next tuple is bracketed time-wise and value-wise by four other tuples within the set of tuples enclosed within the window.

The data stream processing system 106 can determine whether a tuple is bracketed in a number of ways. In one or more embodiments, the data stream processing system 106 compares a tuple to tuple values previously added to the search table to determine whether the tuple of interest is bracketed by four tuples that have been previously added to the search tree. For instance, the data stream processing system 106 can determine whether a current left-below value, left-above value, right-below value, and right-above value dominate the tuple being evaluated by the data stream processing system 106. Further detail in connection with updating the search tree as well as probing the search tree to determine whether a tuple is bracketed by a current set of bracket values will be described below in connection with FIGS. 4A-4B.

Where the data stream processing system 106 determines that the tuple is bracketed (e.g., by tuple values previously added to the search tree), the data stream processing system 106 can perform an act 312 of discarding the next tuple. Alternatively, where the data stream processing system 106 determines that the tuple is not bracketed, the data stream processing system 106 can perform an act 314 of updating the search tree to include the next tuple. In one or more embodiments, the data stream processing system 106 updates the search tree by replacing one or more of the bracketed values (e.g., left-below value, left-above value, right-below value, right-above value) with the next tuple. Further detail in connection with updating the search tree will be discussed below in connection with FIGS. 4A-4B.

After either discarding the tuple or updating the search tree to include the tuple, the data stream processing system 106 can perform an act 316 of determining whether the next tuple was the last tuple to be evaluated (e.g., from the set of tuples enclosed within the window). Where the next tuple is not the last tuple, the data stream processing system 106 can again perform act 304 by identifying a subsequent tuple and further evaluate whether the subsequent tuple either completes a bracket for another tuple and/or if the subsequent tuple is dominated by values currently found within the search tree.

Alternatively, where the next tuple was the last tuple from the set of tuples, the data stream processing system 106 can perform an act 318 of generating or updating a filtered data stream based on the updated search tree. In one or more embodiments, the filtered data stream is representative of the original data stream excluding any tuples that were excluded based on the acts 304-314 discussed above.

In one or more embodiments, the data stream processing system 106 proceeds to a next window and again performs a similar process as discussed in FIG. 3. In one or more embodiments, the data stream processing system 106 simply continues to build on a search tree at each iterative analysis of the tuple windows. For example, rather than initializing a search tree at each subsequent window by deleting all values and beginning from scratch to probe values within a next window, the data stream processing system 106 can maintain values from one or more previous iterations of a window.

In one or more embodiments, the data stream processing system 106 periodically updates the search tree for a given window by discarding, omitting, or ignoring only those tuples that fall outside a current interval of a new window. For example, where two subsequent windows overlap (e.g., as shown in the example discussed above in connection with FIGS. 2A-2C), the data stream processing system 106 may update the search tree between iterative windows by keeping those tuples that survived the tuple analysis from the previous window that also fall within a current window. In this way, the data stream processing system 106 can evaluate tuples within a new window while borrowing from the evaluation that has been previously done on those tuples that overlap with another set of tuples previously evaluated.

As mentioned above, the data stream processing system 106 can evaluate tuples within a given window as well as update the search tree in a variety of ways. In one or more embodiments, the data stream processing system 106 utilizes a greedy algorithm to probe tuples within a window and determine which of the tuples are dominated by other tuples within the window.

In one or more embodiments and as discussed above, the data stream processing system 106 receives a data stream In one or more embodiments, the data stream processing system 106 implements the following greedy algorithm (GREEDY(S)) to initialize a search tree and determine whether to keep or omit tuples from the search tree for use in generating a filtered data stream to provide as input to a stream join model 110.

```
 1:        procedure GREEDY(S)
 2:            RB ← Red - Black [t,v,la,lb,ra,rb]( )
where RB represents a red-black search tree initialized on time event s.t. Elements of RB
may include the value (v) and four time differences corresponding to the chronologically
closest known left/right and above/below tuple values.
 3:            while S.has_next( ) do
 4:                s ← S.next( )
 5:                s.la,s.lb,s.ra,s.rb ← ∞
where s.la,s.lb,s.ra,s.rb indicate Left-above, Left-below, Right-above, and Right-
below time differences relative to tuple (s) that are initialized to infinity (∞).
 6:                s' ← RB.search(s.t)
where s' is initialized as the latest element preceding timestamp s.t.
 7:                while (s.la = ∞ ∨ s.lb = ∞) ∧ s.t - s'.t ≤ ω
                  do
 8:                    if s'.v > s.v then
 9:                        s.la ← s.t - s'.t
10:                        s'.rb ← min(s'.rb,s.t - s'.t)
11:                        if s'.la + s'.ra ≤ ω ∧ s'.lb + s'.rb ≤ ω
                          then
12:                            RB.remove(s')
13:                    else if s'.v < s.v then
14:                        s.lb ← s.t - s'.t
15:                        s'.ra ← min(s'.ra,s.t - s'.t)
16:                        if s'.la + s'.ra ≤ ω ∧ s'.lb + s'.rb ≤ ω
                          then
17:                            RB.remove(s')
18:                    s' ← s.prev
19:                s' ← RB.search(s.t).succ
20:                while (s.ra = ∞ ∨ s.rb = ∞) ∧ s'.t - s.t ≤ ω
                  do
21:                    if s'.v > s.v then
22:                        s.ra ← s.t - s'.t
23:                        s'.lb ← min(s'.lb,s'.t - s.t)
24:                        if s'.la + s'.ra ≤ ω ∧ s'.lb + s'.rb ≤ ω
                          then
25:                            RB.remove(s')
26:                    else if s'v < s.v then
27:                        s.rb ← s'.t - s.t
28:                        s'.la ← min(s'.la,s'.t - s.t)
29:                        if s'.la + s'.ra ≤ ω ∧ s'.lb + s'.rb ≤ ω
                          then
30:                            RB.remove(s')
31:                    s' ← s.succ
32:                if s.la + s.ra > ω ∨ s.lb + s.rb > ω then
33:                    RB.insert(s.t,s.v)
``` including a plurality of tuples. As the data stream is received, in accordance with the greedy algorithm, the data stream processing system 106 can insert the tuples into the search tree sorted based on the time stamps of the plurality of tuples (e.g., sorted left to right). Each tuple may include a payload containing four time differences denoted as "s·lb, s·la, s·rb, s·ra" denoting time differences between a given tuple (s) and a chronologically closest tuple to the left-below (lb), left-above (la), right-below (rb), and right-above (ra). In one or more embodiments, the data stream processing system 106 initializes the search tree by initializing each of the four-time differences as infinity.

In evaluating a tuple, the data stream processing system 106 can probe the search tree using the tuple's time stamp. In particular, the data stream processing system 106 can probe left and right searching for above and below bracketed pairs. Consistent with the workflow 300 of FIG. 3 discussed above, if the probe reveals a bracket of tuple (s) that already exists in the search tree, then the tuple (s) is omitted. The greedy algorithm assumes the use of double-closed interval boundary semantics.

Figure 4A:
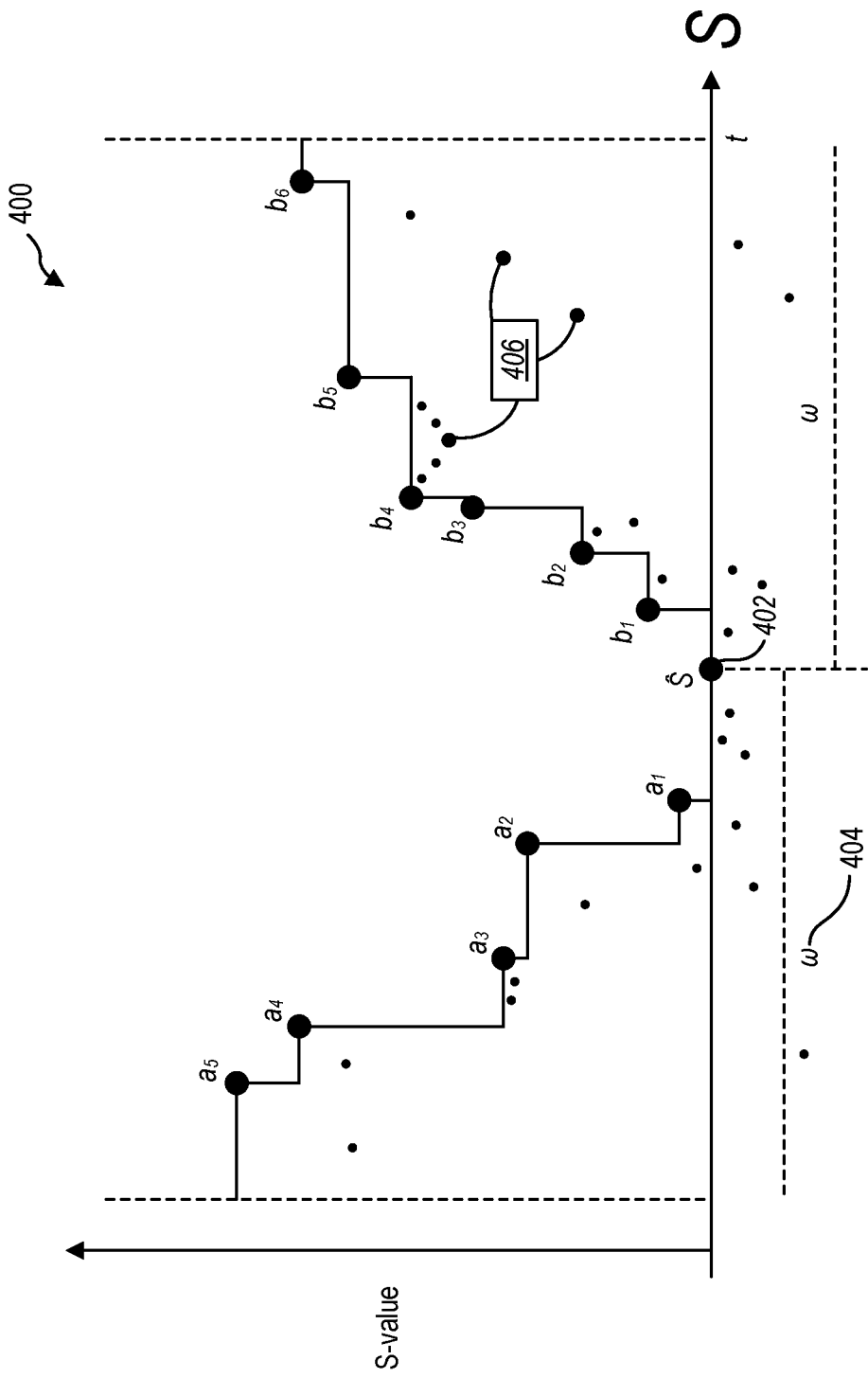
FIGS. 4A-4B illustrates another example execution of an implementation for omitting dominated tuples from a window in accordance with one or more embodiments.
Figure 4B:
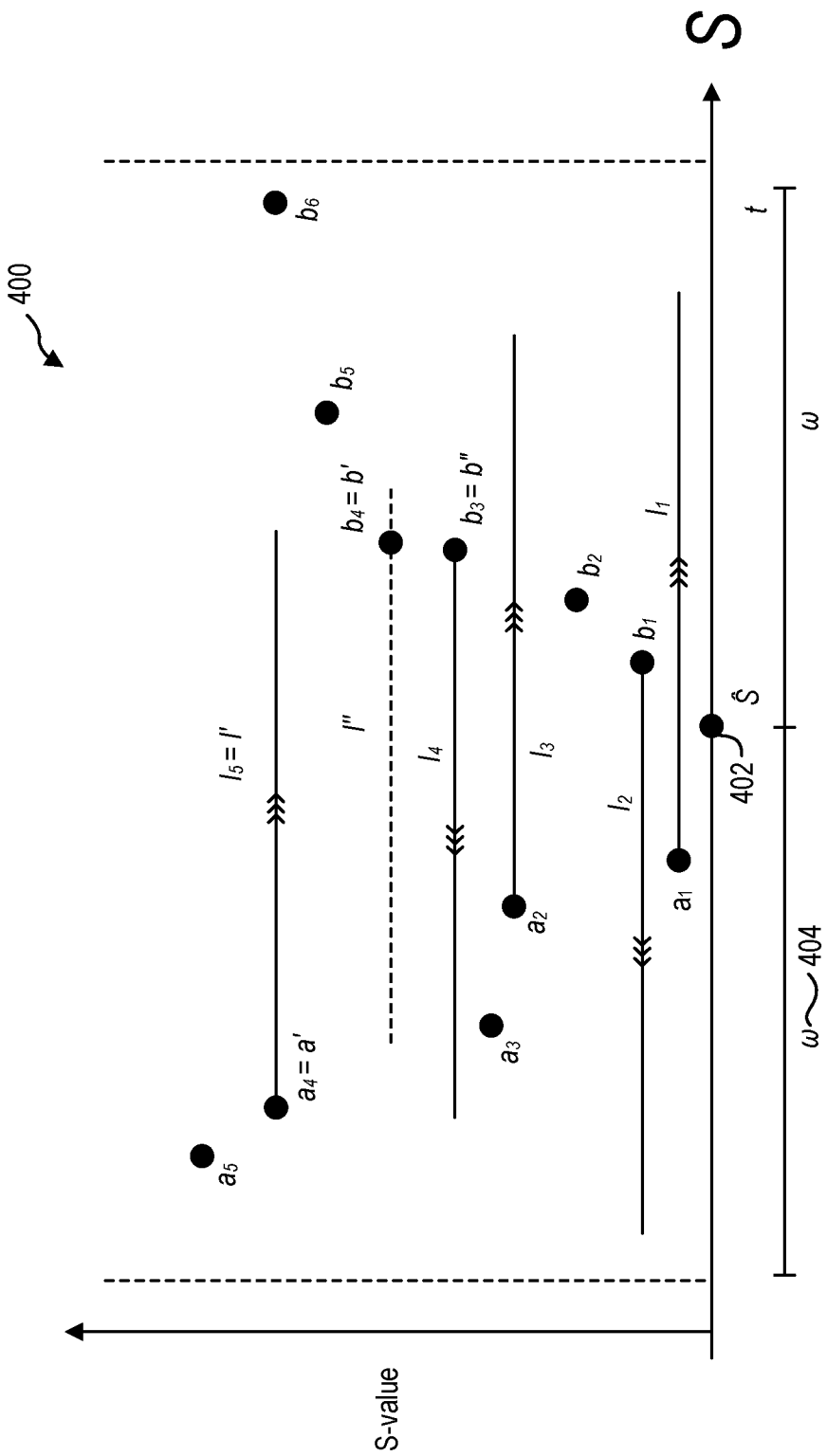

As an illustrative example of an implementation of the above-algorithm, FIGS. 4A-4B illustrate an example sequence of analysis based on a set of tuples 400 included within a window defined by an interval (ω) 404 (or simply "interval 404"). As shown in FIG. 4A and as discussed below, the set of tuples may include left values $a_1$ through $a_5$ and right values $b_1$ through $b_6$ representative of bounding points that may be used to eliminate other tuples 406 from consideration known to be dominated. Related to FIG. 4A, FIG. 4B illustrates intervals $I_1$ through $I_5$ representative of intervals corresponding to the right and left bounding points.

Indeed, the data stream processing system 106 may utilize the above greedy algorithm to construct a sequence of intervals and associated heights beginning with whichever tuples $a_1$ or $b_1$ has a lesser value. In particular, a first interval under consideration is $I_1=[a_1 \cdot t, a_1 \cdot t+\omega]$ with an initial height of $a_1 \cdot v$. As used herein, intervals and heights may be defined as follows: If there exists values from an opposite tuple sequence that fall inside the interval $I_j$, and whose value exceeds $h_j$, then the data stream processing system 106 selects the closest (with respect to time) tuple as the new starting point for $I_{j+1}$ and sets the new height $h_{j+1}$ as the value of the tuple. If the opposite tuple sequence is $\{a_i\}$, the data stream processing system 106 chooses the latest $a_i$. If the opposite tuple sequence is $\{b_i\}$, the data stream processing system 106 chooses the earliest such $b_i$. By constructing $\{a_i\}$ and $\{b_i\}$ in this manner, the tuple that is time-wise closest in value to tuple (ŝ) must be a member of $a_i$ or $b_i$, as shown in FIG. 4B.

It will be appreciated that $h_j$ refers to an increasing sequence of values with upper bound maxes. Thus, there will exist a final interval (I') as shown in FIG. 4B where no tuple from the set of tuples 400 on the opposite side of ŝ exceeds a height of the final interval. As shown in FIGS. 4A-4B, final intervals (I' and I") on each side of tuple (s) refer to maximum intervals on each side of ŝ. By construction of the $\{I_i\}$ sequence, the interval contains ŝ and must contain at least one element b' of the sequence $\{b_i\}$. This is because the previous interval is anchored at a point (b) where a' is within ω of b.

By construction, a' and b' form a bracketing pair on ŝ. Further, a' is maximal on the interval I'. In order to prove that b' is also maximum, the data stream processing system 106 considers the interval I"=[a'·t+δ, a't+ω+δ] where δ is chosen as a value sufficiently small that no tuples appear in the intervals (a't, a't+δ] and (a't+ω,a't+ω+δ]. It will be appreciated that this is guaranteed possible when using double closed, or double open join interval boundary semantics. As shown in FIG. 4B, each of tuples a' and b' are individual maximal in some interval and bracket ŝ. Furthermore, it will be appreciated that FIGS. 4A-4B illustrate an example implementation of the greedy algorithm to determine upper-bound bracket values. While not shown in FIGS. 4A-4B, the data stream processing system 106 may similarly determine lower-bound bracket values using a similar process and algorithm.

While one or more of the above implementations relate to filtering one or two incoming data streams, features and functionality of the above implementations may be applied to more than two input data streams. For example, where the environment 100 described above includes three streaming devices and where the stream join model 110 has similar properties as discussed above, the data stream processing system 106 may apply a similar filtering process under limited circumstances. For example, where the stream join model 110 includes a multijoin function on streams R, S, and T where R ⋈ S ⋈ T, streams R and T may be filtered relative to tuples from S in a similar fashion as discussed above in connection with two incoming data streams described in one or more embodiments above. In this particular example, however, the S-stream cannot be filtered without causing potential problems due to the intersection of S relative to each of streams R and T.

Figure 5:
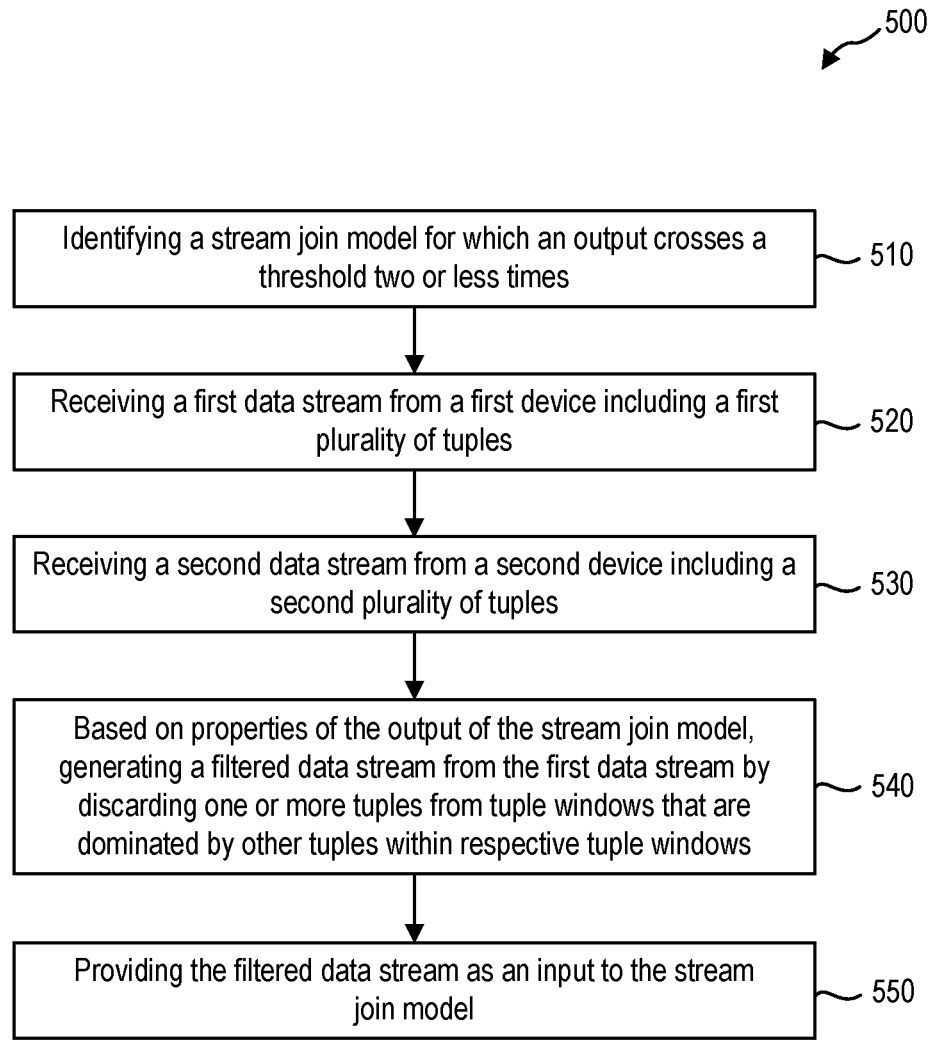
FIG. 5 illustrates an example series of acts for receiving and processing multiple data streams in accordance with one or more embodiments.
Figure 6:
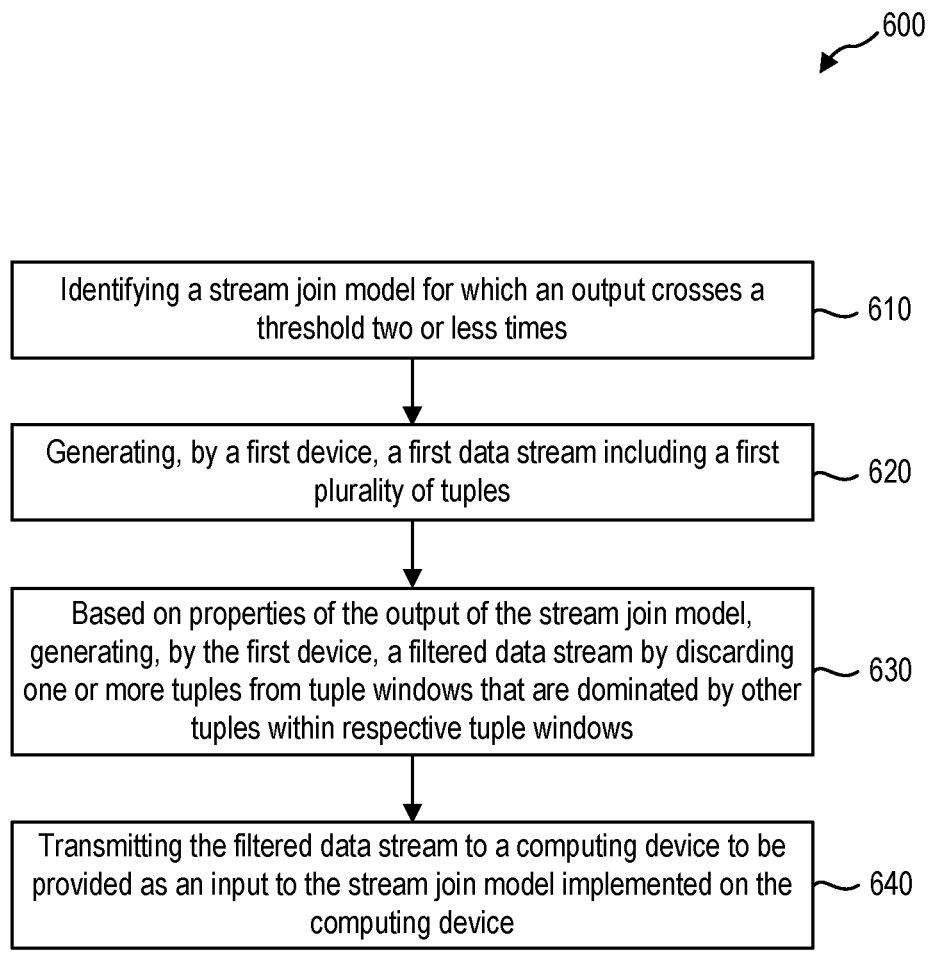
FIG. 6 illustrates another example series of acts for generating and filtering a data stream for processing in accordance with one or more embodiments.

Turning now to FIGS. 5-6, these figures illustrate example flowcharts including series of acts associated with generating and receiving data streams as well as generating filtered data streams to provide as inputs to a stream join model in accordance with one or more embodiments. While FIGS. 5-6 illustrate acts according to one or more embodiments, alternative embodiments may omit, add to, reorder, and/or modify any of the acts shown in FIGS. 5-6. The acts of FIGS. 5-6 can be performed as part of a method. Alternatively, a non-transitory computer-readable medium can include instructions that, when executed by one or more processors, cause a computing device to perform the acts of FIGS. 5-6. In still further embodiments, a system can perform the acts of FIGS. 5-6.

FIG. 5 illustrates a series of acts 500 for receiving data streams and generating a filtered data stream in accordance with one or more embodiments described herein. As shown in FIG. 5, the series of acts 500 includes an act 510 of identifying a stream join model for which an output crosses a threshold two or less times. In one or more implementations, the act 510 involves identifying a stream join model including a threshold function for which an output of the stream join model crosses a threshold two or less times with respect to a variable (and for which a set of values that triggers the threshold do not live between the two crossing points). In one or more embodiments, the threshold function of the stream join mode includes one or more of a convex function, a linear function, or a step function.

As further shown, the series of acts 500 includes an act 520 of receiving a first data stream from a first device including a first plurality of tuples. For example, the act 520 may involve receiving a first data stream from a first device, the first data stream including a first plurality of tuples to be provided as a first input to the stream join model. The series of acts 500 may further include an act 530 of receiving a second data stream from a second device including a second plurality of tuples. For example, the act 530 may involve receiving a second data stream from a second device, the second data stream including a second plurality of tuples to be provided as a second input to the stream join model. In one or more embodiments, the first device includes a first Internet of Things (IoT) device in wireless communication with a computing device that receives the first data stream. In addition, the second device may include a second IoT device in wireless communication with the computing device that receives the second data stream.

As further shown, the series of acts 500 may include an act 540 of, based on properties of the output of the stream join model, generating a filtered data stream from the first data stream by discarding one or more tuples from tuple windows that are dominated by other tuples within respective tuple windows. For example, the act 540 may include generating a filtered data stream from the first data stream based on the threshold function having a property that causes the output of the stream join model to cross the threshold two or less times where generating the filtered data stream includes discarding one or more tuples from tuple windows based on determining that the one or more tuples are dominated by additional tuples within the respective tuple windows.

In one or more embodiments, generating the filtered data stream includes, for each tuple window of a plurality of tuple windows, identifying a tuple window including a set of tuples from the first plurality of tuples within the tuple window. Generating the filtered data stream may further include determining that at least one tuple from the set of tuples is dominated by other tuples within the set of tuples. Generating the filtered data stream may also include discarding the at least one tuple from the set of tuples based on determining that the at least one tuple from the set of tuples is dominated. Identifying the tuple window may include identifying a predetermined time window based on a timestamp of a tuple from the second data stream. In addition, the set of tuples may include any tuples from the first plurality of tuples having associated timestamps within the predetermined time window and that have not been discarded from another set of tuples for another tuple window that overlaps the tuple window.

In one or more embodiments, determining that the at least one tuple from the set of tuples is dominated by other tuples within the set of tuples may include determining that the at least one tuple is bracketed by four tuples from the set of tuples within the tuple window. The four tuples may include a first tuple having an earlier timestamp and a lower value than a timestamp and a value of the at least one tuple, a second tuple having an earlier timestamp and a higher value than the timestamp and the value of the at least one tuple, a third tuple having a later timestamp and a lower value than the timestamp and the value of the at least one tuple, and a fourth tuple having a later timestamp and a higher value than the timestamp and the value of the at least one tuple.

If the at least one tuple is bracketed by the four tuples within the set of tuples, generating the filtered data stream may include discarding the at least one tuple from the set of tuples. Alternatively, if the at least one tuple is not bracketed by four tuples within the set of tuples, generating the filtered data stream may include not discarding the at least one tuple from the set of tuples.

As further shown, the series of acts 500 may include an act 550 of providing the filtered data stream as an input to the stream join model. For example, the act 550 may involve providing the filtered data stream as a first input to the stream join model in conjunction with tuples from the second data stream.

Each tuple from the first plurality of tuples and the second plurality of tuples may include a timestamp and an associated value captured by the first device or the second device at a time corresponding to the associated timestamp. In one or more embodiments, the series of acts 500 includes detecting a delay in values from the second data stream while continuing to receive values from the first data stream where generating the filtered data stream is performed in response to detecting the delay in values from the second data stream while continuing to receive values from the first data stream.

In one or more embodiments, the series of acts 500 includes generating a second filtered data stream from the second data stream based on the threshold function having the property that causes the output of the stream join model to cross the threshold two or less times. In one or more implementations, the series of acts 500 further includes providing the second filtered data stream as a second input to the stream join model in conjunction with the filtered data stream.

FIG. 6 illustrates another series of acts 600 for generating a filtered data stream and transmitting the filtered data stream for further processing by a computing device. As shown in FIG. 6, the series of acts 600 includes an act 610 of identifying a stream join model for which an output crosses a threshold two or less times. For example, the act 610 may involve identifying a stream join model including a threshold function for which an output of the stream join model crosses a threshold two or less times with respect to a variable.

As further shown, the series of acts 600 includes an act 620 of generating, by a first device, a first data stream including a first plurality of tuples. In one or more embodiments, the act 620 involves generating, by a first device, a first data stream, the first data stream including a first plurality of tuples to be provided as a first input to the stream join model in conjunction with a second data stream originating from a second device.

As further shown in FIG. 6, the series of acts 600 includes an act 630 of, based on properties of the output of the stream join model, generating, by the first device a filtered data stream by discarding one or more tuples from tuple windows that are dominated by other tuples within respective tuple windows. For example, the act 630 may involve generating, by the first device, a filtered data stream based on the threshold function having a property that causes the output of the stream join model to cross the threshold two or less times. The act 630 may further involve, for each tuple window of a plurality of tuple windows: identifying a tuple window including a set of tuples from the first plurality of tuples within the tuple window, determining that one or more tuples from the set of tuples is dominated by other tuples within the set of tuples, and discarding the one or more tuples from the set of tuples based on determining that the one or more tuples is dominated.

In one or more embodiments, identifying the tuple window includes identifying a predetermined time window based on a timestamp of a tuple from the second data stream. In addition, the set of tuples may include any tuples from the first plurality of tuples having associated timestamps within the predetermined time window and that have not been discarded from another set of tuples for another tuple window that overlaps the tuple window.

As further shown, the series of acts 600 may include an act 640 of transmitting the filtered data stream to a computing device to be provided as an input to the stream join model implemented on the computing device. In particular, the act 640 may involve transmitting the filtered data stream to a computing device having the stream join model implemented thereon. Moreover, determining whether the at least one tuple from the set of tuples is dominated may involve similar features and functionalities discussed above in connection with the series of acts 500 illustrated in FIG. 5.

Figure 7:
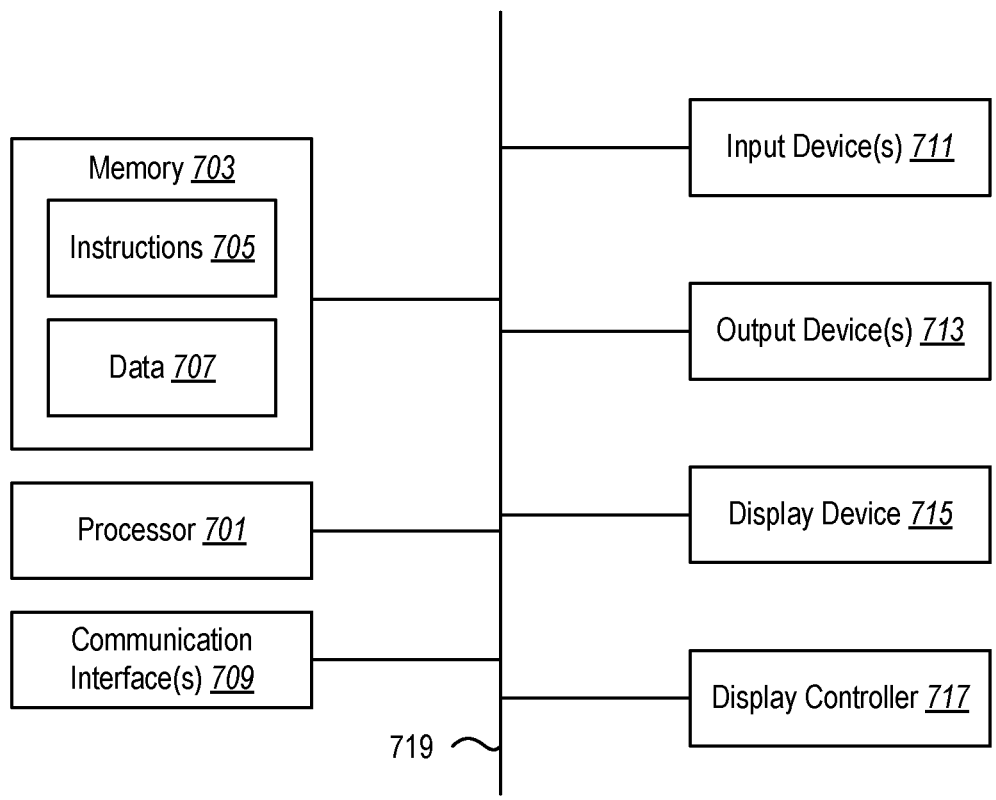
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a digital medium environment for processing input streams generated by multiple devices, a method for optimizing a join function over the input streams, the method comprising:
   identifying a stream join model including a threshold function for which an output of the stream join model crosses a threshold two or less times with respect to a variable;
   receiving a first data stream from a first device, the first data stream including a first plurality of tuples to be provided as a first input to the stream join model;
   receiving a second data stream from a second device, the second data stream including a second plurality of tuples to be provided as a second input to the stream join model;
   generating a filtered data stream from the first data stream based on the threshold function having a property that causes the output of the stream join model to cross the threshold two or less times, wherein generating the filtered data stream comprises discarding one or more tuples from tuple windows based on determining that the one or more tuples are bracketed between earlier timestamps, later timestamps, lower tuple values, and higher tuple values from additional tuples of the first stream of tuples within the respective tuple windows; and
   providing the filtered data stream as a first input to the stream join model in conjunction with tuples from the second data stream.

2. The method of claim 1, wherein generating the filtered data stream comprises, for each tuple window of a plurality of tuple windows:
   identifying a tuple window including a set of tuples from the first plurality of tuples within the tuple window;
   determining that at least one tuple from the set of tuples is bracketed between earlier timestamps, later timestamps, lower tuple values, and higher tuple values of other tuples within the set of tuples; and
   discarding the at least one tuple from the set of tuples based on determining that the at least one tuple from the set of tuples is bracketed.

3. The method of claim 2, wherein identifying the tuple window includes identifying a predetermined time window based on a timestamp of a tuple from the second data stream.

4. The method of claim 3, wherein the set of tuples includes any tuples from the first plurality of tuples having associated timestamps within the predetermined time window and that have not been discarded from another set of tuples for another tuple window that overlaps the tuple window.

5. The method of claim 2, wherein determining that the at least one tuple from the set of tuples is bracketed comprises determining that the at least one tuple is bracketed by four tuples from the set of tuples, the four tuples comprising:
   a first tuple having an earlier timestamp and a lower value than a timestamp and a value of the at least one tuple;
   a second tuple having an earlier timestamp and a higher value than the timestamp and the value of the at least one tuple;
   a third tuple having a later timestamp and a lower value than the timestamp and the value of the at least one tuple; and
   a fourth tuple having a later timestamp and a higher value than the timestamp and the value of the at least one tuple.

6. The method of claim 5, wherein
   if the at least one tuple is bracketed by the four tuples within the set of tuples, generating the filtered data stream comprises discarding the at least one tuple from the set of tuples; and
   if the at least one tuple is not bracketed by four tuples within the set of tuples, generating the filtered data stream comprises not discarding the at least one tuple from the set of tuples.

7. The method of claim 1, wherein the threshold function of the stream join model includes one or more of a convex function, a linear function, or a step function.

8. The method of claim 1,
   wherein the first device comprises a first sensor configured to capture a first type of data, and
   wherein the second device comprises a second sensor configured to capture a second type of data.

9. The method of claim 8,
   wherein the first device comprises a first Internet of Things (IoT) device in wireless communication with a computing device that receives the first data stream, and
   wherein the second device comprises a second IoT device in wireless communication with the computing device that receivers the second data stream.

10. The method of claim 1, wherein each tuple from the first plurality of tuples and the second plurality of tuples includes a timestamp and an associated value captured by the first device or the second device at a time corresponding to the associated timestamp.

11. The method of claim 1, further comprising detecting a delay in values from the second data stream while continuing to receive values from the first data stream, wherein generating the filtered data stream is performed in response to detecting the delay in values from the second data stream while continuing to receive values from the first data stream.

12. The method of claim 1, further comprising generating a second filtered data stream from the second data stream based on the threshold function having the property that causes the output of the stream join model to cross the threshold two or less times.

13. The method of claim 12, further comprising providing the second filtered data stream as a second input to the stream join model in conjunction with the filtered data stream.

14. In a digital medium environment for processing input streams generated by multiple devices, a method for optimizing a join function over the input streams, the method comprising:
   identifying a stream join model including a threshold function for which an output of the stream join model crosses a threshold two or less times with respect to a variable;
   generating, by a first device, a first data stream, the first data stream including a first plurality of tuples to be provided as a first input to the stream join model in conjunction with a second data stream originating from a second device;
   generating, by the first device, a filtered data stream based on the threshold function having a property that causes the output of the stream join model to cross the threshold two or less times, wherein generating the filtered data stream comprises, for each tuple window of a plurality of tuple windows:
      identifying a tuple window including a set of tuples from the first plurality of tuples within the tuple window;
      determining that one or more tuples from the set of tuples is bracketed between earlier timestamps, later timestamps, lower tuple values, and higher tuple values of other tuples within the set of tuples; and
      discarding the one or more tuples from the set of tuples based on determining that the one or more tuples is bracketed between the earlier timestamps, the later timestamps, the lower tuple values, and the higher tuple values; and
   transmitting the filtered data stream to a computing device having the stream join model implemented thereon.

15. The method of claim 14,
   wherein identifying the tuple window includes identifying a predetermined time window based on a timestamp of a tuple from the second data stream, and
   wherein the set of tuples includes any tuples from the first plurality of tuples having associated timestamps within the predetermined time window and that have not been discarded from another set of tuples for another tuple window that overlaps the tuple window.

16. The method of claim 14, wherein determining that the at least one tuple from the set of tuples is bracketed comprises determining that the at least one tuple is bracketed by four tuples from the set of tuples, the four tuples comprising:
   a first tuple having an earlier timestamp and a lower value than a timestamp and a value of the at least one tuple;
   a second tuple having an earlier timestamp and a higher value than the timestamp and the value of the at least one tuple;
   a third tuple having a later timestamp and a lower value than the timestamp and the value of the at least one tuple; and
   a fourth tuple having a later timestamp and a higher value than the timestamp and the value of the at least one tuple.

17. The method of claim 16, wherein
   if the at least one tuple is bracketed by the four tuples within the set of tuples, generating the filtered data stream comprises discarding the at least one tuple from the set of tuples; and
   if the at least one tuple is not bracketed by four tuples within the set of tuples, generating the filtered data stream comprises not discarding the at least one tuple from the set of tuples.

18. A system, comprising:
   one or more processors;
   memory in electronic communication with the one or more processors;

instructions stored in the memory, the instructions being executable by the one or more processors to:

identify a stream join model including a threshold function for which an output of the stream join model crosses a threshold two or less times with respect to a variable;

receive a first data stream from a first device, the first data stream including a first plurality of tuples to be provided as a first input to the stream join model;

receive a second data stream from a second device, the second data stream including a second plurality of tuples to be provided as a second input to the stream join model;

generate a filtered data stream from the first data stream based on the threshold function having a property that causes the output of the stream join model to cross the threshold two or less times, wherein generating the filtered data stream comprises discarding one or more tuples from tuple windows based on determining that the one or more tuples are bracketed between earlier timestamps, later timestamps, lower tuple values, and higher tuple values from additional tuples of the first stream of tuples within the respective tuple windows; and provide the filtered data stream as a first input to the stream join model in conjunction with tuples from the second data stream.

19. The system of claim 18, wherein generating the filtered data stream comprises, for each tuple window of a plurality of tuple windows:

identifying a tuple window including a set of tuples from the first plurality of tuples within the tuple window;

determining that at least one tuple from the set of tuples is bracketed between earlier timestamps, later timestamps, lower tuple values, and higher tuples values of other tuples within the set of tuples; and discarding the at least one tuple from the set of tuples based on determining that the at least one tuple from the set of tuples is bracketed.

20. The system of claim 18, wherein the threshold function of the stream join model includes one or more of a convex function, a linear function, or a step function.

\* \* \* \* \*